(12) United States Patent
Carlson et al.

(10) Patent No.: US 7,133,291 B2
(45) Date of Patent: *Nov. 7, 2006

(54) CARRIER DEVICE AND METHOD FOR A MULTIPLE DISC ARRAY

(75) Inventors: Grant Edward Carlson, Florissant, CO (US); Karl Heinz Cunha, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 10/884,605

(22) Filed: Jul. 2, 2004

(65) Prior Publication Data

US 2006/0002077 A1    Jan. 5, 2006

(51) Int. Cl.
G06F 1/16 (2006.01)
H05K 7/14 (2006.01)

(52) U.S. Cl. .............. 361/727; 312/223.1; 312/223.2; 361/725; 361/728

(58) Field of Classification Search ................ 361/685, 361/724, 727
See application file for complete search history.

(56) References Cited

U.S. PATENT DOCUMENTS

| | | | |
|---|---|---|---|
| 3,725,883 A | 4/1973 | Bennett et al. | |
| 4,024,581 A | 5/1977 | Lesca et al. | |
| 4,669,616 A | 6/1987 | Mazura | |
| 4,754,397 A | 6/1988 | Varaiya et al. | |
| 5,019,948 A | 5/1991 | Steketee et al. | |
| 5,124,886 A | 6/1992 | Golobay | |
| 5,232,089 A * | 8/1993 | Kim | 206/308.1 |
| 5,247,427 A | 9/1993 | Driscoll et al. | |
| 5,375,706 A * | 12/1994 | Perez | 206/309 |
| 5,517,373 A | 5/1996 | Hanson | |
| 5,566,049 A * | 10/1996 | Nguyen | 361/685 |
| 5,604,662 A | 2/1997 | Anderson et al. | |
| 5,652,697 A | 7/1997 | Le | |
| 5,729,763 A | 3/1998 | Leshem | |
| 5,738,226 A | 4/1998 | Dean | |
| 5,752,257 A | 5/1998 | Ripoll et al. | |
| 5,808,864 A | 9/1998 | Jung | |
| 5,822,184 A | 10/1998 | Rabinovitz | |
| 5,912,799 A | 6/1999 | Grouell et al. | |
| 5,913,926 A | 6/1999 | Anderson et al. | |
| 5,933,395 A | 8/1999 | Dang et al. | |
| 5,974,490 A | 10/1999 | Fujimura et al. | |
| D421,428 S | 3/2000 | Wu | |
| 6,076,142 A | 6/2000 | Corrington et al. | |
| 6,078,503 A | 6/2000 | Gallagher et al. | |
| 6,230,217 B1 | 5/2001 | Tuccio et al. | |

(Continued)

FOREIGN PATENT DOCUMENTS

EP    1 026 688 A3    6/2001

(Continued)

*Primary Examiner*—Lynn Feild
*Assistant Examiner*—Anthony Q. Edwards
(74) *Attorney, Agent, or Firm*—Fellers, Snider, et al.

(57) ABSTRACT

An array storage system and associated method are provided comprising a multiple disc array. The multiple disc array comprises a partition defining attachment points for fixing each of a plurality of data storage devices to the partition arranged in a first and a second array, wherein a data storage device in the first array operably spins oppositely with respect to a data storage device in the second array. Two identical partitions, each supporting arrays of data storage devices, can be joined together to increase the storage capacity of the multiple disc array.

14 Claims, 7 Drawing Sheets

U.S. PATENT DOCUMENTS

| | | |
|---|---|---|
| 6,243,790 B1 | 6/2001 | Yorimitsu |
| 6,317,329 B1 | 11/2001 | Dowdy et al. |
| 6,349,043 B1 | 2/2002 | Jensen et al. |
| 6,351,375 B1 | 2/2002 | Hsieh et al. |
| 6,356,457 B1 | 3/2002 | Haworth |
| 6,373,712 B1 | 4/2002 | Bailis et al. |
| 6,392,892 B1 * | 5/2002 | Sobolewski et al. ........ 361/724 |
| 6,397,293 B1 | 5/2002 | Shrader et al. |
| 6,424,523 B1 | 7/2002 | Curtis et al. |
| 6,442,022 B1 | 8/2002 | Paul |
| 6,464,509 B1 | 10/2002 | Emberty et al. |
| 6,522,553 B1 | 2/2003 | Hardin et al. |
| 6,574,687 B1 | 6/2003 | Teachout et al. |
| 6,618,246 B1 | 9/2003 | Sullivan et al. |
| 6,637,719 B1 | 10/2003 | Jiang |
| 6,640,235 B1 | 10/2003 | Anderson |
| 6,646,882 B1 * | 11/2003 | Shih .......................... 361/724 |
| 6,649,070 B1 | 11/2003 | Inagaki |
| 6,650,533 B1 | 11/2003 | Curtis et al. |
| 6,651,138 B1 | 11/2003 | Lai et al. |
| 6,665,189 B1 | 12/2003 | Lebo |
| 6,683,793 B1 | 1/2004 | Campbell et al. |
| 6,698,851 B1 | 3/2004 | Ludl |
| 6,704,832 B1 | 3/2004 | Ng |
| 6,707,670 B1 | 3/2004 | Seal |
| 6,742,068 B1 | 5/2004 | Gallagher et al. |
| 2002/0144044 A1 | 10/2002 | Moon et al. |
| 2003/0041201 A1 | 2/2003 | Rauscher |
| 2003/0070043 A1 | 4/2003 | Merkey |
| 2003/0081378 A1 | 5/2003 | Debbins et al. |
| 2004/0057203 A1 | 3/2004 | Rabinovitz |
| 2005/0185374 A1 * | 8/2005 | Wendel et al. .............. 361/685 |

FOREIGN PATENT DOCUMENTS

| | | |
|---|---|---|
| WO | WO 97/45784 | 12/1997 |
| WO | WO 99/60832 | 11/1999 |

* cited by examiner

CARRIER DEVICE AND METHOD FOR A MULTIPLE DISC ARRAY

FIELD OF THE INVENTION

The embodiments of the present invention relate generally to the field of array storage systems and more particularly but without limitation to a carrier for convertibly componentizing various numbers and sizes of data storage devices to define a multiple disc array.

BACKGROUND

Ever-increasing demand for data storage capacity has fostered the development of improved data array storage systems wherein a plurality of data storage devices are electronically linked to function synergistically. Data integrity schemes are also enhanced in such arrays permitting fail-safe redundant storage of data, such as in redundant arrays of independent device ("RAID") systems.

There are a number of challenges facing the array designer. For example, the many and complex mechanical and electrical connections required for each data storage device are multiplied by the number in an array. That is, each and every data storage device requires sufficient mechanical support to isolate the delicate head and disc components from vibration levels that create data transfer errors. Not only must attention be paid to self-excitation, that is, vibration caused by the rotating disc of a data storage device itself, but like attention is required to external excitation sources in such an environment. External excitation can come from other data storage devices in the array, electrical components in the array such as power supplies and fans, and from the installation and/or removal of data storage devices while the array is operational.

As the number of data storage devices in arrays increases, the problems associated with electromagnetic interference containment are exacerbated as well. Properly shielding the data storage devices requires attention paid not only to leak paths between drives in adjacent shelves, but also to the leak paths potentially created by the multiple openings into which each of the plurality of data storage devices is inserted. Adequate shielding of these openings must be provided while still permitting the ability to insert and/or remove a data storage device without disrupting the shielding in place for adjacent data storage devices in the array.

Flexibility can be a problem as well. For instance, traditionally the electrical systems, such as the connector boards, controllers, and connecting buses, are hard-wired for a predetermined number and size of data storage devices in the array. This is required to maintain the electrical integrity of the array while permitting swapping of individual data storage devices. For this reason, the storage shelves and the associated electrical systems are dedicated for the predetermined number and size of data storage devices. Accordingly, because of both mechanical and electrical constraints, an array designed for a particular form factor configuration cannot readily be adapted for use with a different form factor. Also, if a grouping of data storage devices is needed for a particular function, such as mirroring the storage of data, such functionality must conventionally be achieved at the top level host programming level. This requires complex and coordinated programming of many data storage devices.

While various approaches have been proposed in the art to address maximizing the data storage capacity while also providing operable flexibility in the utilization of data storage devices in array storage systems, there nevertheless remains a continued need for improvements in the art. It is to such improvements that the claimed invention is directed.

SUMMARY OF THE INVENTION

In accordance with preferred embodiments of the present invention, an apparatus and method are contemplated for convertibly componentizing data storage devices in a multiple disc array.

In some preferred embodiments an array storage system is provided comprising a partition defining attachment points for fixing each of a plurality of data storage devices to the partition arranged in a first and a second array, wherein a data storage device in the first array operably spins oppositely with respect to a data storage device in the second array.

In other preferred embodiments a multiple disc array is provided comprising a first partition removably connected to a second partition, the partitions defining attachment points for fixing each of a plurality of data storage devices to the partition arranged in different first and second groups.

In other preferred embodiments a carrier is provided for supporting data storage devices comprising a partition defining attachment points adapted for fixing each of a plurality of data storage devices to the partition arranged in a first and a second array such that a data storage device fixed in the first array operably spins oppositely with respect to a data storage device fixed in the second array.

In other preferred embodiments a method is provided for supporting rotating disc data storage devices in a multiple disc array, comprising fixing a first data storage device to a partition, and fixing a second data storage device to the partition in an orientation establishing an opposite direction of disc rotation with respect to the first data storage device.

These and various other features and advantages which characterize the claimed invention will become apparent upon reading the following detailed description and upon reviewing the associated drawings.

BRIEF DESCRIPTION OF THE DRAWINGS

FIG. 6 is an exploded isometric view of the multiple disc array of FIG. 3.

DETAILED DESCRIPTION

Figure 1:
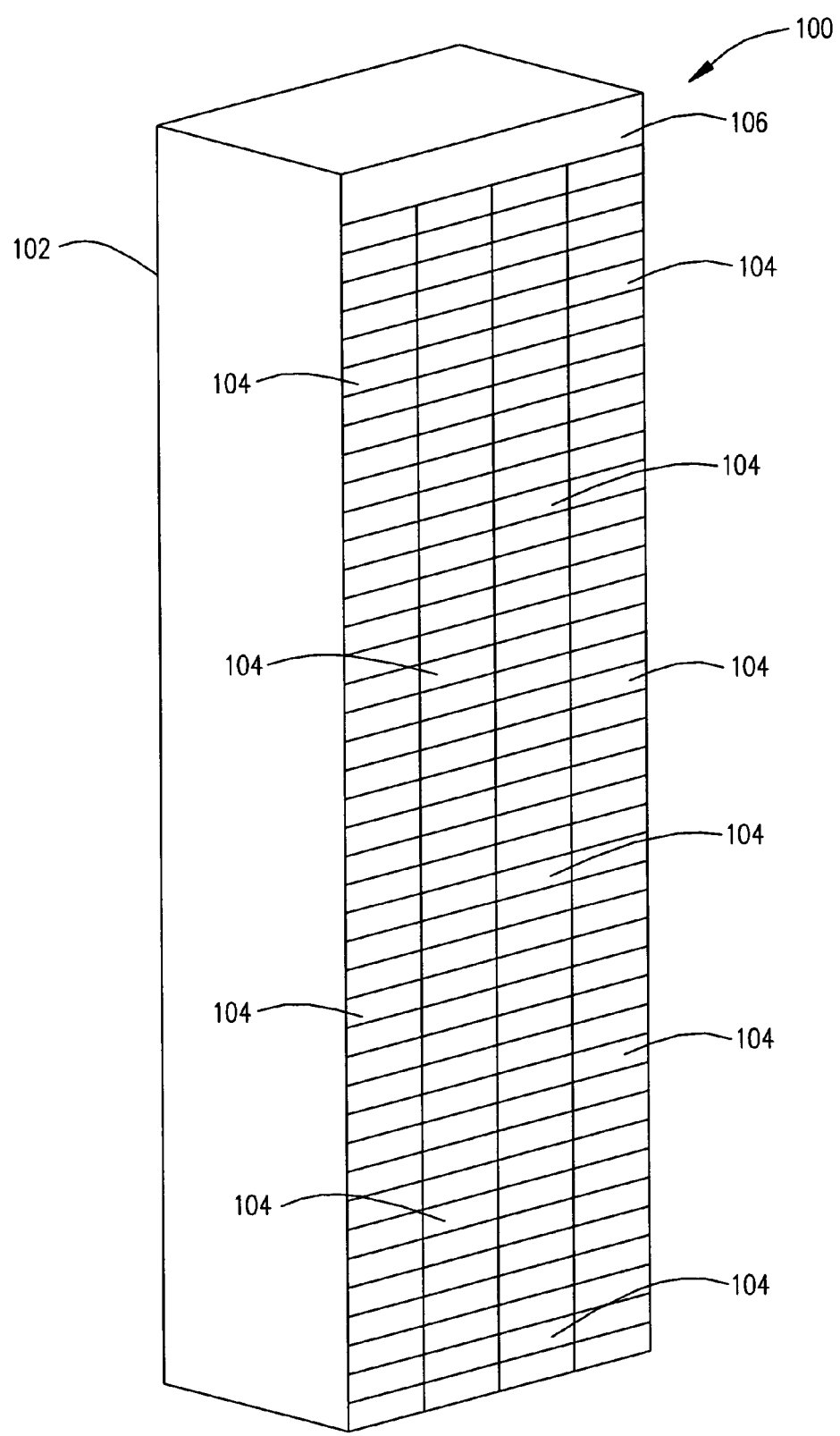
FIG. 1 is an isometric view of an array storage system constructed in accordance with related art solutions.

FIG. 1 is an isometric view of a related art array storage system 100 wherein a cabinet 102 supports a plurality of data storage devices 104. A host 106 is electrically connected to each of the data storage devices 104 so as to provide a bulk data storage arrangement, such as for providing a network interface and/or for employing data integrity schemes such as in a RAID system.

Figure 2:
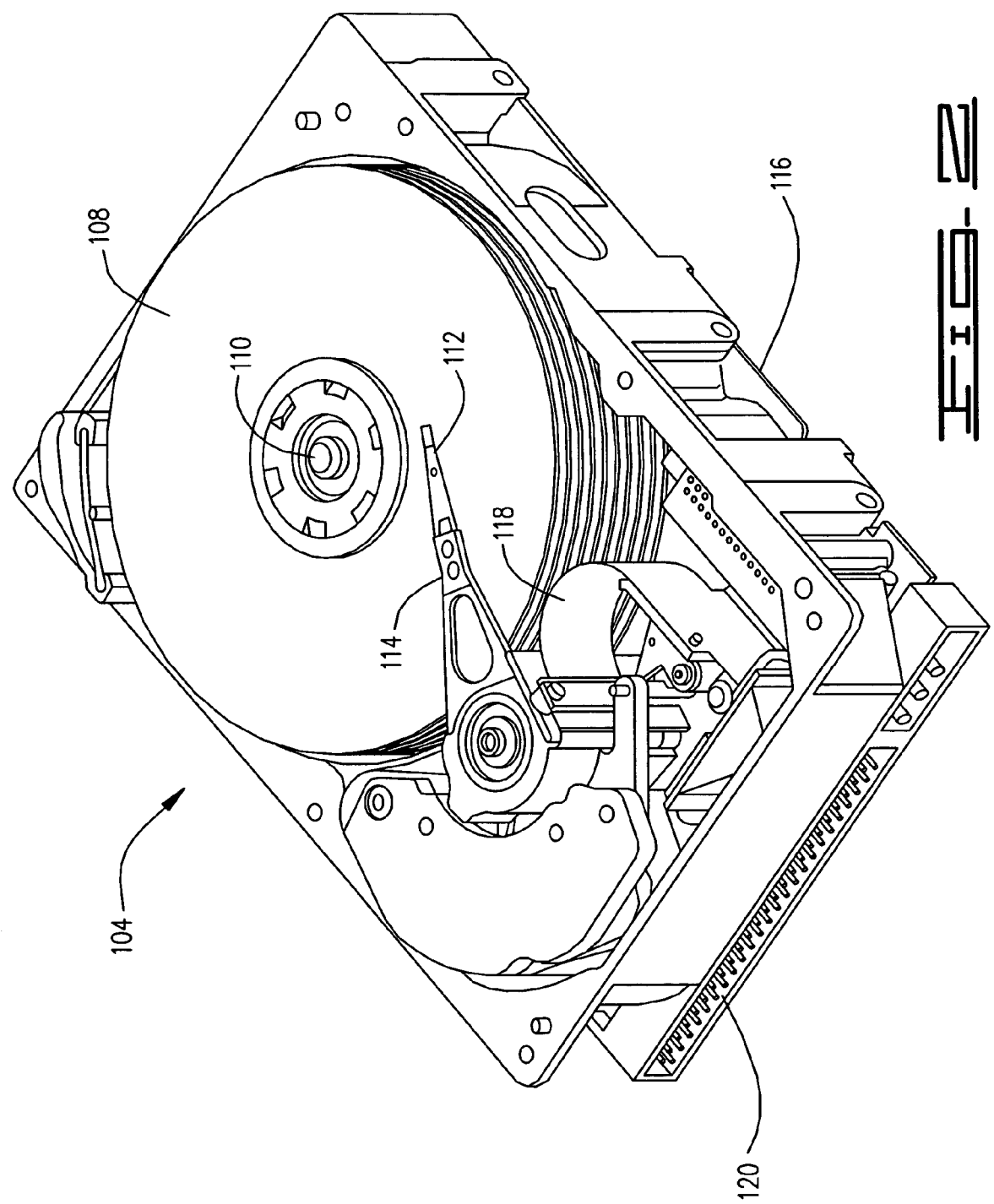
FIG. 2 is an isometric view of a data storage device.

FIG. 2 is an isometric view of a data storage device 104 suited for use with the present invention and in the form of a rotating magnetic media disc drive. A data storage disc 108 is rotated by a motor 110 to present data storage locations of the disc 108 to a read/write head ("head") 112. The head 112 is supported at the distal end of a rotary actuator 114 that is capable of moving the head 112 radially between inner and outer tracks of the disc 108. The head 112 is electrically connected to a circuit board 116 by way of a flex circuit 118. The circuit board 116 is adapted to receive and send control signals controlling the functions of the data storage device 104. A connector 120 is electrically connected to the circuit board 116, and is adapted for connecting the data storage device 104 with control electronics of the array 100.

The array storage system 100 offers one way of combining the storage capability of a number of data storage devices 104. Disadvantageously, however, the individual openings in the cabinet 102 are sized and wired to receivingly engage either individual data storage devices 104, or a fixed number and size of data storage devices 104.

Figure 3:
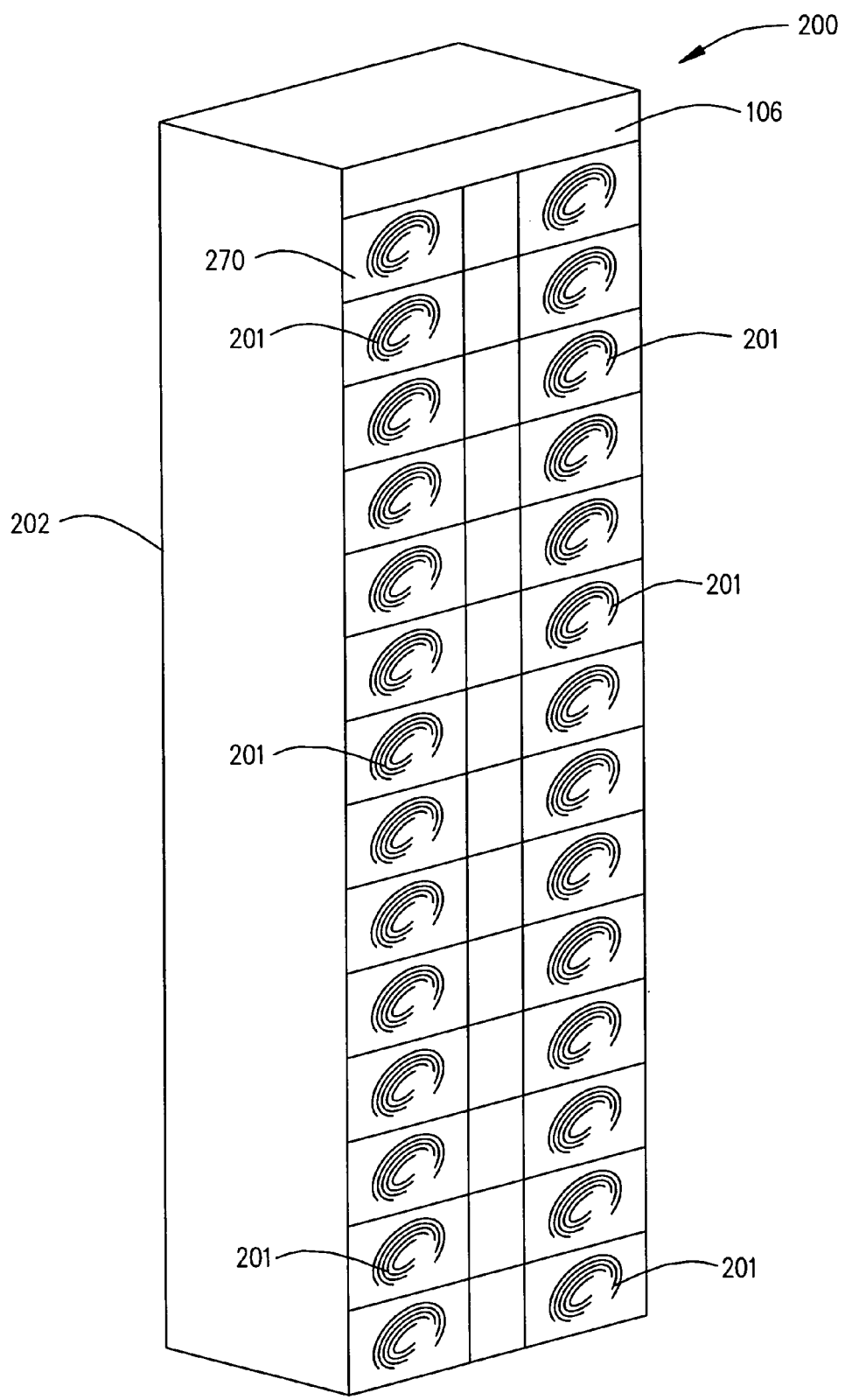
FIG. 3 is an isometric view of an array storage system constructed in accordance with embodiments of the present invention.
Figure 4:
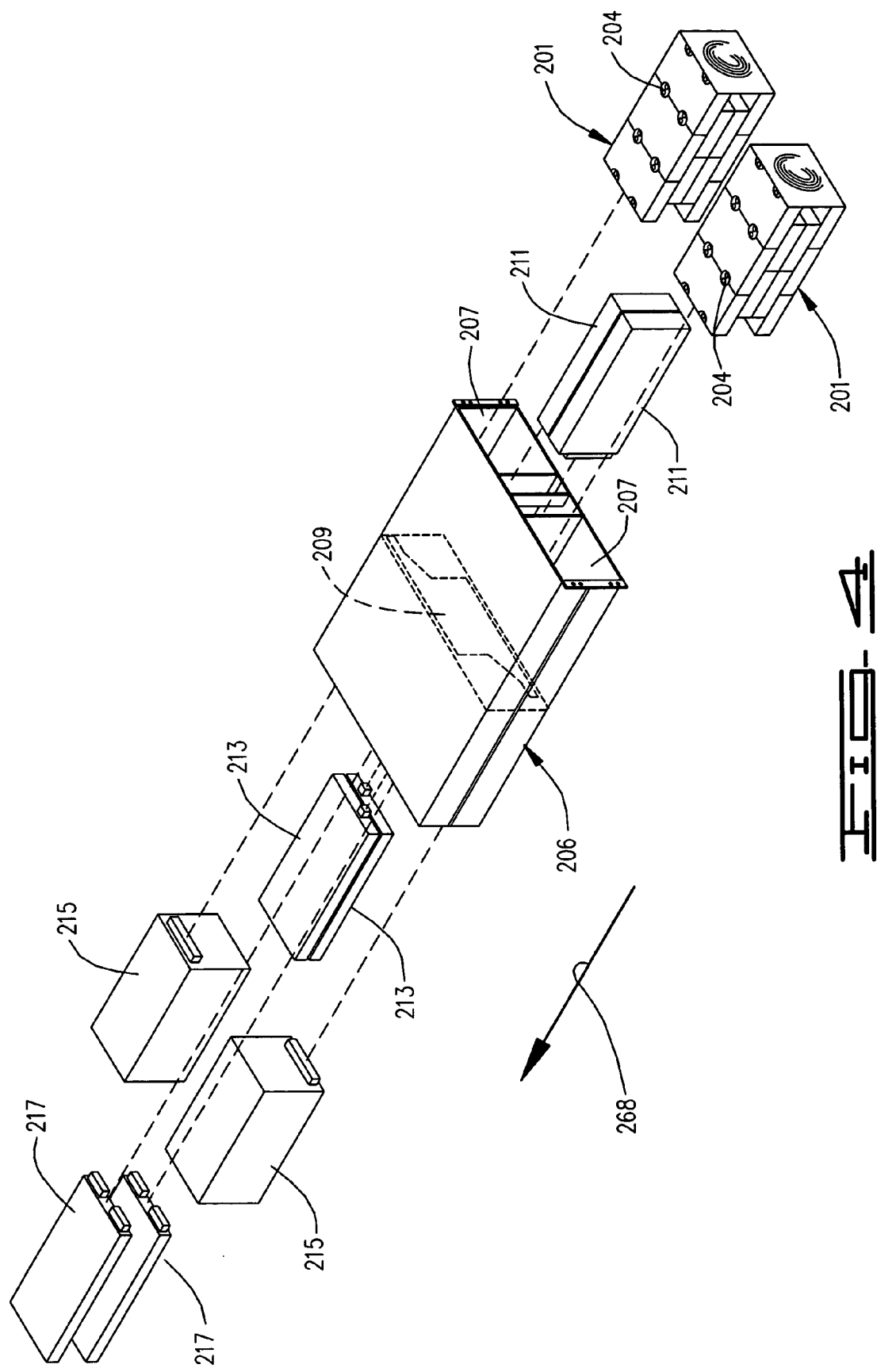
FIG. 4 is an exploded isometric view of portions of the array storage system of FIG. 3.

FIGS. 3 and 4 illustrate an array storage system 200 constructed in accordance with novel embodiments of the present invention, wherein a plurality of multiple disc arrays ("MDA") 201 are utilized. An MDA 201 generally comprises a convertible plurality of componentized data storage devices 104. By "convertible" it is meant that one or more data storage devices 104 can be readily replaced, added, or removed in an existing MDA 201, or that a different MDA can be utilized that is capable of supporting a different number, size or arrangement of data storage devices. By "componentized" it is meant that the data storage devices 104 and associated control electronics in the MDA 201 are integrated so as to be functionally presented to the array 200 as a single component.

A cabinet 202 defines a plurality of cavities into each of which a shelf 206 is receivingly engaged. Each shelf 206 defines one or more cavities 207 into each of which an MDA 204 is receivingly engaged for engagement with a backplane 209. Similarly, the shelf 206 defines cavities for receivingly engaging other electrical modules with the backplane 209, such as, but not limited to, controllers 211, batteries 213, power supplies 215, and interfaces 217.

In the illustrative embodiment of FIG. 4, the shelf 206 defines two cavities 207 for receiving two MDAs 201. Equivalent alternative embodiments contemplate a different number of MDAs 201 per shelf 206. The array storage system 200 comprises a plurality of MDAs 201, each sized in accordance with the respective cavity 207 for an operable mating relationship. Each MDA 201 is adapted to operably support a variable number, size, or arrangement of data storage devices 104. More particularly, this solution provides an array storage system 200 comprising a shelf 206 for receivingly engaging an MDA 201 comprising a carrier 204 from a plurality of different carriers, each carrier of the plurality having common exterior dimensions defining an operable mating relationship with the cavity 207 of the shelf 206, and each carrier of the plurality differentiated by interior supporting features for supporting a selected number, size, or arrangement of data storage devices 104.

Figure 5:
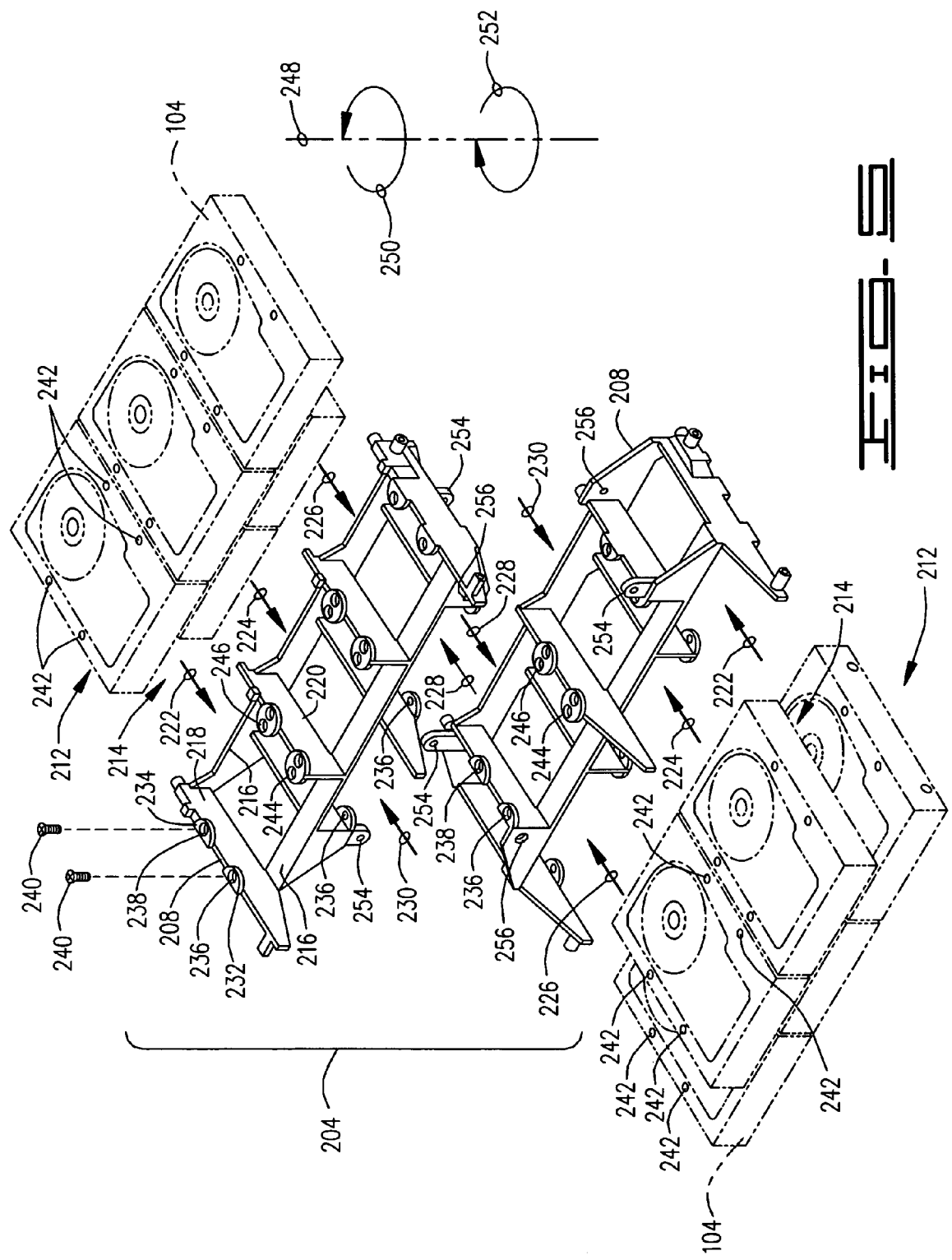
FIG. 5 is an exploded isometric view of the carrier portion of FIG. 4.
Figure 9:
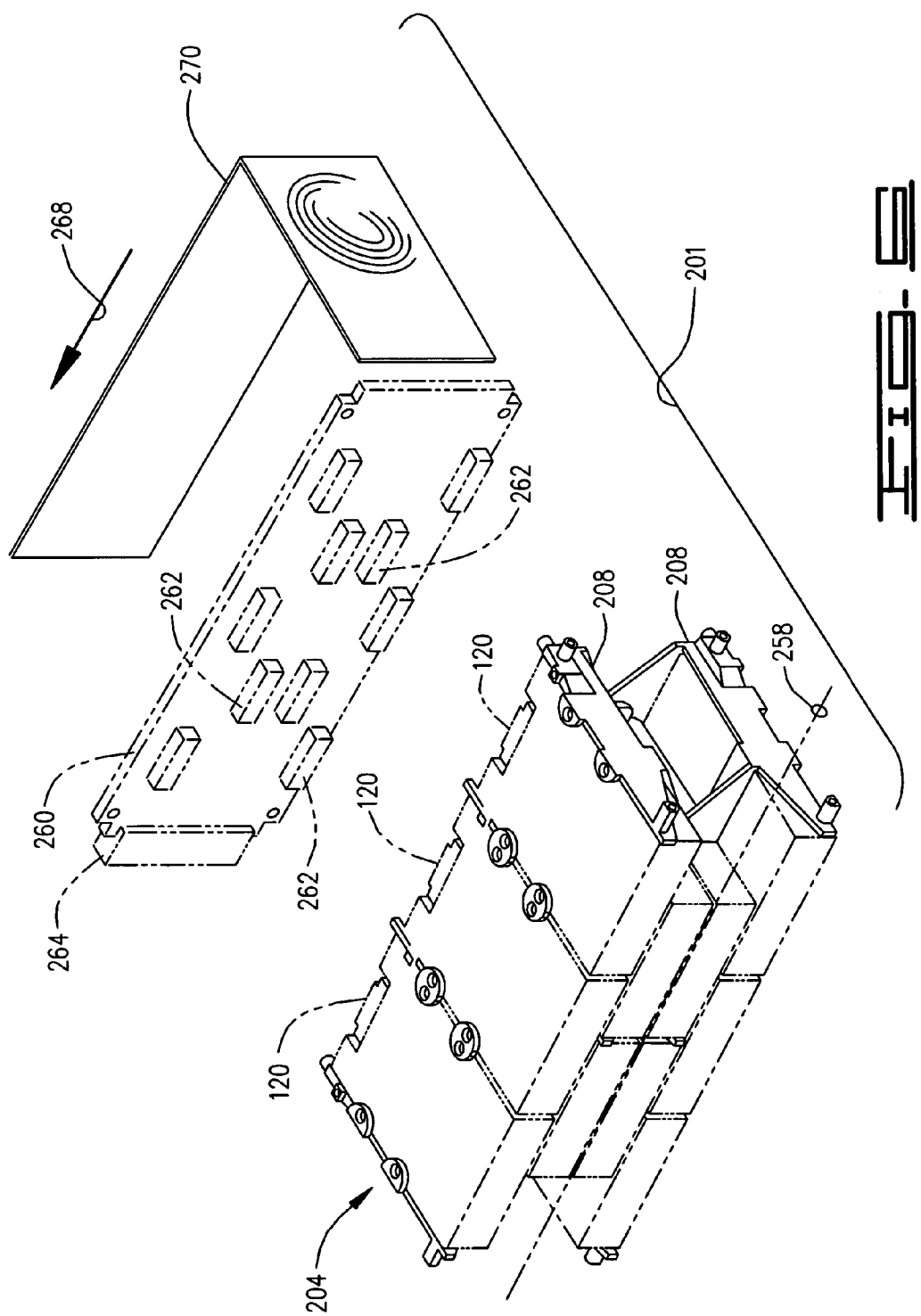

FIG. 5 is an exploded isometric view illustrating embodiments wherein the carrier 204 comprises a pair of identical partitions 208 that are joined together. In this arrangement the joined partitions 208, each supporting a plurality of data storage devices 104, are receivingly engageable within one cavity 207 of the shelf 206 (FIG. 4) which is, in turn, receivingly engageable within the cavity of the cabinet 202 (FIG. 4). In some embodiments of the present invention, the shelf 206 is fixed within the cabinet 202 and the carrier 204 is insertable and removable from the shelf 206 so that individual data storage devices 104 can be readily added, removed or replaced. In other embodiments of the present invention, a carrier 204 can be replaced with another carrier having different data storage device supporting features for electrically connecting a different selected number, size, or arrangement of data storage devices 104 in the shelf 206.

In the illustrative embodiments of FIG. 5 the partition 208 supports a first linear array 212 of three data storage devices 104 and a second linear array 214 of two data storage devices 104. The partition 208 defines a planar support surface 216 and opposing transverse side members 218, 220 defining a channel 222 for receivingly engaging one of the data storage devices 104 therein. Similarly, channels 224, 226 are defined for receivingly engaging the other two data storage devices 104 in the first array 212, and channels 228, 230 are defined for receivingly engaging the data storage devices 104 in the second array 214.

Tab members 232, 234 extend transversely from the distal end of the side member 218 and define attachment points 236, 238, respectively, for fixing the data storage device 104 to the partition 208. In some embodiments the attachment points 236, 238 can comprise a clearance aperture for passing a fastener 240 therethrough for engaging an attachment feature 242 of the data storage device 104. For example, the fasteners 240 can comprise threaded fasteners that threadingly engage threaded openings 242 provided in the data storage device 104. In the illustrative embodiments of FIG. 5 there are four attachment points 236, 238, 244, 246 for fixing each data storage device 104. Positively fixing each of the data storage devices 104 to the partition 208 in this manner advantageously damps vibration created by the rotating discs 108.

It will be noted that the data storage devices 104 in the second array 214 must be flipped, with respect to those in the first array 212, in order for the attachment features 242 to align with the attachment points 236, 238, 244, 246 associated with the channels 228, 230. This causes the data storage devices 104 in the first array 212 to spin oppositely with respect to data storage devices 104 in the second array 214. That is, with respect to a reference axis of rotation 248 that is parallel with the axis of rotation of all data storage devices 104, if the data storage devices 104 in the first array 212 operably rotate in direction 250, then by the flipped relational orientation the data storage devices 104 in the second array 214 will rotate oppositely in direction 252.

This opposite rotation of data storage devices 104 in different arrays 212, 214 reduces vibration in comparison to arrangements where all the data storage devices 104 spin in the same direction. For example, differential rotational vibration is effectively canceled between adjacent, oppositely rotating data storage devices 104 rather than being accumulated by rotating in the same direction.

For illustrative embodiments of FIG. 5, first attachment features 254 are alignable with second attachment features 256 for joining the two partitions 208 together. For example, the first attachment feature 254 can define a clearance aperture for passing a fastener (not shown) therethrough and fixingly engaging the second attachment feature 256.

FIG. 6 illustrates embodiments wherein the two partitions 208 are joined together along a demarcation axis 258 to form the carrier 204. In alternative equivalent embodiments the carrier 204 could comprise only one partition 208. It will be noted that by first fixing all the data storage devices 104 to the respective partitions 208 and then connecting the partitions 208 together that the attachment features 236, 238, 244, 246 are readily accessible for all data storage devices. To maximize the vibration-reducing benefits of the oppositely-spinning data storage devices 104, the arrays 212, 214 are disposed substantially parallel to and mirrored around the demarcation axis 258.

Within the carrier 204, each of the data storage devices 104 has the electrical connector 120 disposed within a coplanar arrangement of all connectors 120 of all the data storage devices 104. The carrier 204 supports a circuit board 260 having a number of connectors 262 arranged to align with the connectors 120 of the respective data storage devices 104. The circuit board 260 preferably further has a connector 264 that is adapted to connect to the electronics of the array storage system 200 via the backplane 209 (FIG. 4). It will be noted that in the illustrative embodiments of FIG. 6, the connector 264 is aligned for an operable insertion connection with the backplane 209 by moving the circuit board 260 in a direction 268 along the longitudinal depth of the shelf 206 (FIG. 4). In this manner, the electrical connection between the circuit board 260 and the array storage system 200 is readily made as a result of inserting the MDA 201 into the shelf 206 (FIG. 4). The circuit board 260 is selectively configured such that upon operative insertion of the carrier 204, the host 106 can be placed in electrical communication with each and every data storage device 104 in the MDA 201, and the data storage devices 104 can be in electrical communication with other data storage devices 104 both inside and outside a particular MDA 201.

The carrier 204 can support a wrapper 270 for enclosing the data storage devices 104 and/or the circuit board 260 for electrical shielding. In the illustrative embodiments of FIG. 6 the wrapper 270 covers just the front and circuit board portions of the MDA 201. The carrier 204 also preferably comprises one or more guide members that are adapted for aligning with mating features in the backplane 209 (FIG. 4) to positively align the MDA 201 during insertion.

Figure 7:
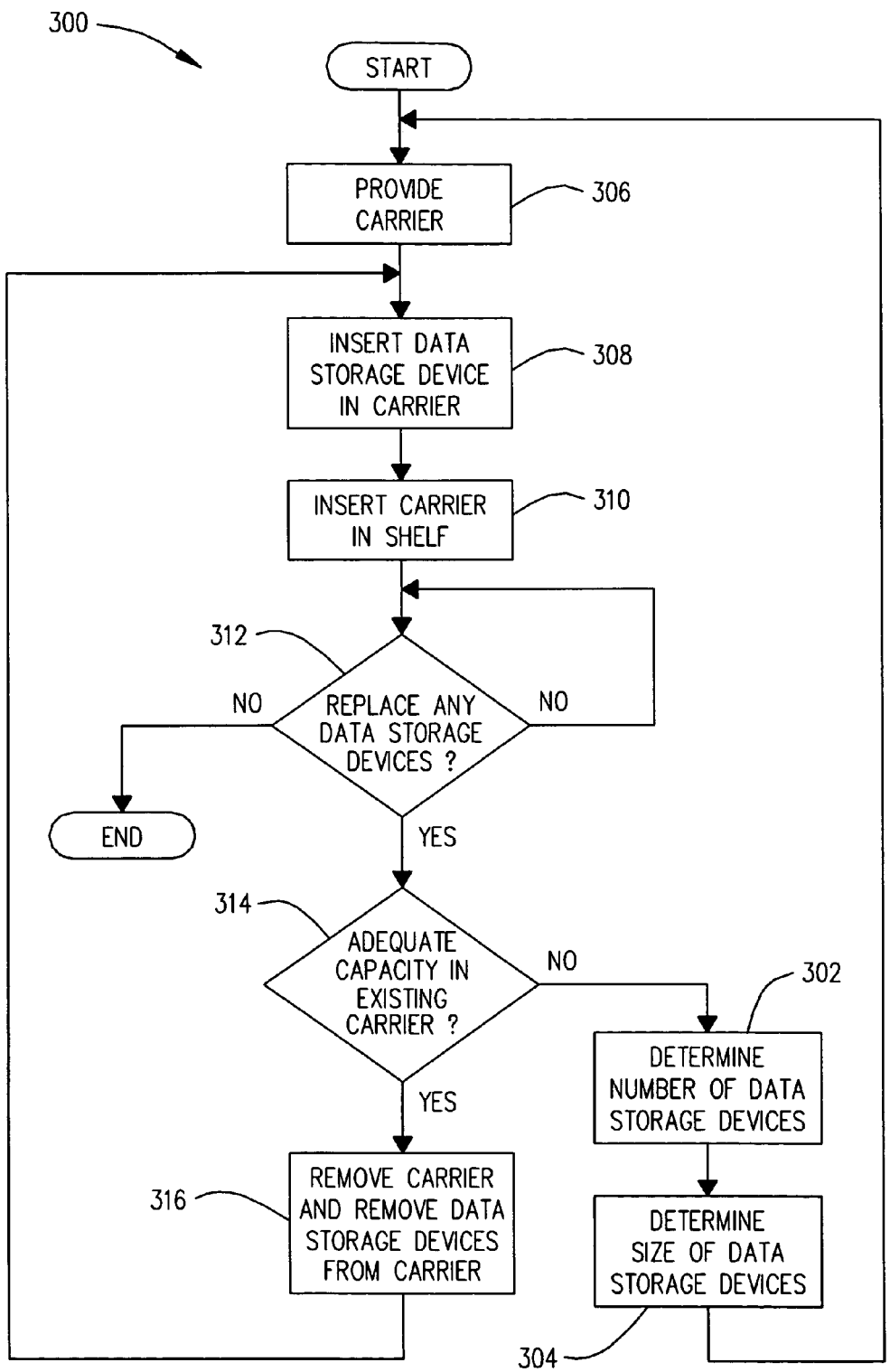
FIG. 7 is a flow diagram of a method for componentizing a selected number and size of data storage devices as a multiple disc array in accordance with embodiments of the present invention.

FIG. 7 is a flow chart of illustrative steps for a method 300 for supporting a plurality of data storage devices 104 in an MDA 201 in accordance with embodiments of the present invention. The method 300 initially determines the number of data storage devices 104 desired in step 302 and the size of the data storage devices 104 desired in step 304. From these determinations, an appropriately configured carrier 204 can be selected in step 306. It will be noted that the number and size of the supporting channels 222 do not have to exactly match the number of data storage devices 104 desired; rather, a carrier 204 with currently unused channels 222 can be used in future expansion of capacity by adding more data storage devices 104 in the same carrier 204.

The data storage devices 104 are inserted into the carrier 204 in step 308. The insertion step comprises fixing a first data storage device 104 to the partition 208, and fixing a second data storage device 104 to the partition 208 in an orientation establishing an opposite direction of disc 108 rotation with respect to the first data storage device 104. In some embodiments the insertion step further comprises fixing a third data storage device 104 to another identical partition 208 and connecting the partitions 208 together. The carrier 204 is then inserted into the shelf 206 in step 310.

Decision step 312 determines whether any presently employed data storage devices 104 need to be changed, such as for maintenance, repair, archiving or the like. If yes, then decision block 314 determines whether there is an adequate capacity of supporting channels in the presently used carrier 204. If yes, such as when one data storage device 104 is being replaced with an identical one, then in step 316 the carrier 204 is removed from the shelf 206 and one or more data storage devices 104 are removed from the carrier 204. The method then returns to step 308 where one or more data storage devices 104 are inserted into the carrier 204.

If the determination of step 314 is no, then a differently configured carrier is needed. The method returns to step 302 and 304 which define the appropriate carrier, and the method returns to the providing the carrier step 306.

Summarizing, a carrier (such as 204) is used for componentizing a number of data storage devices (such as 104) in an MDA (such as 201). The carrier is unitarily removable and insertable in a shelf (such as 206) of an array storage system (such as 200). The carrier comprises a partition (such as 208) defining an arrangement of channels (such as 222) for receivingly engaging a data storage device. The number of channels is associated with the selected number of data storage devices, and the size of the channels is associated with the selected size of the data storage devices. The partition further defines attachment points (such as 232) for fixing the data storage device to the partition.

The partition supports a first array (such as 212) of data storage devices and a second array (such as 214) of data storage devices, such that a data storage device in the first array operably spins oppositely with respect to a data storage device in the second array. The carrier can comprise two partitions, each supporting arrays of data storage devices, that are connected together along a demarcation axis (such as 258). The data storage devices can be disposed substantially parallel to and in a mirrored arrangement around the demarcation axis. Preferably, an equivalent number of data storage devices are supported in the partitions.

The data storage devices are supported in the carrier such that an electrical connector (such as 120) of each is disposed within a coplanar arrangement of all the connectors of the data storage devices in the MDA. The carrier supports a circuit board (such as 260) for operatively connecting the selected number of data storage devices in the MDA. A wrapper (such as 270) can enclose the carrier and/or circuit board for electrical shielding.

Embodiments of the present invention contemplate a method for supporting a data storage device in an array storage system. The method comprises providing a carrier (such as 306) from a plurality of different carriers that is insertable in a shelf supported in the array storage system; the carrier defining an arrangement of channels that each supportingly engage a data storage device, wherein the number of channels is associated with a selected number of data storage devices, and wherein the size of each channel is associated with a selected size of the data storage device, and wherein the different carriers have common volumetric dimensions but varying number and/or size of channels. The method further comprises inserting one or more data storage devices in a respective number of channels in the carrier (such as 308). The insertion step comprises fixing a first data storage device to the partition, and fixing a second data storage device to the partition in an orientation establishing an opposite direction of disc rotation with respect to the first data storage device. In some embodiments the insertion step further comprises fixing a third data storage device to another identical partition and connecting the partitions together. The carrier is then inserted into the shelf (such as 310).

The method further comprises the replacing of an existing data storage device in the array storage system, by removing the carrier from the shelf and removing a data storage device from the carrier (such as 316), inserting another data storage device in the carrier (such as 308), and inserting the carrier back in the shelf (such as 310). The method of replacing an existing data storage device in the array storage system can furthermore comprise removing the carrier from the shelf, and inserting a different carrier supporting one or more data storage devices in the shelf (such as 302, 304, 306).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular configuration of the channel surfaces defining the channels without departing from the spirit and scope of the present invention.

What is claimed is:

1. An array storage system comprising a partition defining clearance apertures configured for passing fasteners respectively therethrough to fix each of a plurality of data storage devices to the partition arranged in a first and a second array, wherein a data storage device in the first array operably spins oppositely with respect to a data storage device in the second array.

2. The system of claim 1 comprising a second partition supporting an array of data storage devices that is connected to the first partition along a demarcation axis.

3. The system of claim 2 wherein the arrays are disposed substantially parallel to the demarcation axis.

4. The system of claim 2 wherein the partitions support an equivalent number of data storage devices.

5. The system of claim 2 wherein the arrays define a mirrored arrangement of data storage devices around the demarcation axis.

6. The system of claim 2 wherein the partitions are identical.

7. A carrier for supporting data storage devices comprising a partition defining clearance apertures for passing fasteners respectively therethrough to fix each of a plurality of data storage devices to the partition arranged in a first and a second array such that a data storage device fixed in the first array operably spins oppositely with respect to a data storage device fixed in the second array.

8. The carrier of claim 7 comprising a second partition adapted for supporting an array of data storage devices and connectable to the first partition along a demarcation axis.

9. The carrier of claim 8 wherein the arrays are disposed substantially parallel to the line of demarcation.

10. The carrier of claim 8 wherein the partitions are adapted to support an equivalent number of data storage devices.

11. The cater of claim 8 adapted for positioning an electrical connector of each data storage device in a coplanar arrangement of all connectors of the data storage devices in the partitions.

12. The carrier of claim 8 wherein the partitions are identical.

13. A method for supporting rotating disc data storage devices in a multiple disc array comprising:

fixing a first data storage device to a partition with fasteners passing through clearance apertures defined by the partition;

fixing a second data storage device to the partition in the same manner of fixing as for the first data storage device and in an orientation establishing an opposite direction of disc rotation with respect to the first data storage device.

14. The method of claim 13 further comprising fixing a third data storage device to another identical partition and connecting the partitions together.

* * * * *